(12) United States Patent
Shin et al.

(10) Patent No.: US 12,709,273 B2
(45) **Date of Patent: *Aug. 18, 2026**

(54) VEHICLE AND METHOD FOR CONTROLLING THE SAME

(71) Applicants: Hyundai Motor Company, Seoul (KR); Kia Corporation, Seoul (KR)

(72) Inventors: Jincheol Shin, Hwaseong (KR); Jinhyung Lee, Seoul (KR); Jeongyeop Woo, Incheon (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 119 days.

This patent is subject to a terminal disclaimer.

(21) Appl. No.: 18/368,933

(22) Filed: Sep. 15, 2023

(65) Prior Publication Data

US 2024/0001925 A1 Jan. 4, 2024

Related U.S. Application Data

(63) Continuation of application No. 16/543,898, filed on Aug. 19, 2019, now Pat. No. 11,794,745.

(30) Foreign Application Priority Data

Jan. 22, 2019 (KR) ........................ 10-2019-0008024

(51) Int. Cl.
*B60W 30/18* (2012.01)
*B60L 7/10* (2006.01)
(Continued)

(52) U.S. Cl.
CPC ......... *B60W 30/18127* (2013.01); *B60L 7/10* (2013.01); *B60L 15/20* (2013.01);
(Continued)

(58) Field of Classification Search
CPC ... B60W 30/18127; B60L 15/20; B60L 50/50; B60L 53/60; B60L 2240/642; B60L 58/13
(Continued)

(56) References Cited

U.S. PATENT DOCUMENTS 11,780,335 B2 * 10/2023 Breen ........................ B60L 7/10 701/22
11,794,745 B2 * 10/2023 Shin .......................... B60L 7/10
(Continued)

FOREIGN PATENT DOCUMENTS

JP 2015-076929 A 4/2015
JP 2015076929 * 4/2015 ............. Y02T 10/70
WO WO-2020064918 A1 * 4/2020 ............. B60S 13/00

OTHER PUBLICATIONS

Machine Translation Yamada et al. JP2015076929 (Year: 2015).*
(Continued)

*Primary Examiner* — Jacob S. Scott
*Assistant Examiner* — Michael E Butler
(74) *Attorney, Agent, or Firm* — Fox Rothschild LLP

(57) ABSTRACT

A vehicle is provided that includes a battery; a motor configured to rotate a wheel using electric power charged in the battery; and a communication device that performs communication with other vehicles and a terminal. A controller operates the communication device to transmit request information of a charging service when an amount of charge of the battery is equal to or less than a preset amount of charge and charges the battery based on electric power generated by the motor while using the charging service through one of the other vehicles.

19 Claims, 11 Drawing Sheets

(51) Int. Cl.

*B60L 15/20* (2006.01)
*B60L 50/50* (2019.01)
*B60L 53/60* (2019.01)
*B60L 58/13* (2019.01)

(52) U.S. Cl.

CPC ............... *B60L 50/50* (2019.02); *B60L 53/60* (2019.02); *B60L 58/13* (2019.02); *B60L 2240/642* (2013.01)

(58) Field of Classification Search

USPC ............................................................ 701/22
See application file for complete search history.

(56) References Cited

U.S. PATENT DOCUMENTS

| | | | | |
|---|---|---|---|---|
| 2009/0108803 | A1 | 4/2009 | Singarajan et al. | |
| 2013/0204471 | A1 | 8/2013 | O'Connell et al. | |
| 2018/0251037 | A1 | 9/2018 | Alvarez Ruiz et al. | |
| 2018/0257634 | A1 | 9/2018 | Zhao et al. | |
| 2018/0326852 | A1 | 11/2018 | Shiozawa et al. | |
| 2019/0291734 | A1* | 9/2019 | Mizuno | B60L 15/2009 |
| 2025/0135898 | A1* | 5/2025 | Cho | B60W 20/14 |

OTHER PUBLICATIONS

Office Action for Korean Patent Application No. 10-2019-0008024 from Korean Intellectual Property Office, dated Apr. 29, 2024, with English translation, 12 pages.

* cited by examiner

FIG. 6B

| TORQUE(NM) \ ROTATIONAL SPEED(rpm) | ~1000 | ~2000 | ~3000 | ~4000 | ~5000 | ~6000 | ~7000 | ~8000 | ~9000 | ~10000 | ~11000 |
|---|---|---|---|---|---|---|---|---|---|---|---|
| −10 | 68.9 | 80.1 | 84.9 | 86.5 | 87.6 | 88.8 | 89.6 | 88.8 | 85.2 | 83.7 | 82.5 |
| −20 | 68.3 | 79.6 | 86.7 | 88.5 | 90.5 | 93.5 | 93.6 | 92.5 | 90.8 | 88.6 | 88.4 |
| −30 | 72.1 | 82.9 | 89.1 | 90.9 | 92.6 | 94.5 | 94.7 | 94.1 | 92.5 | 91.4 | 91.3 |
| −40 | 73.1 | 84.0 | 90.2 | 91.7 | 93.6 | 95.6 | 95.4 | 94.5 | 93.7 | 92.3 | 92.0 |
| −50 | 72.9 | 84.3 | 90.6 | 92.2 | 94.1 | 95.4 | 95.6 | 94.8 | 93.9 | 93.2 | 92.5 |
| −60 | 72.4 | 84.3 | 90.6 | 92.3 | 94.3 | 95.6 | 95.5 | 95.0 | 94.2 | 93.6 | 93.0 |
| −70 | 71.4 | 83.9 | 90.6 | 92.4 | 94.4 | 95.5 | 95.7 | 94.9 | 94.3 | 93.6 | 93.0 |
| −80 | 70.3 | 83.5 | 90.5 | 92.4 | 94.4 | 95.9 | 95.4 | 94.7 | 94.0 | 93.3 | 92.8 |
| −90 | 69.0 | 82.9 | 90.2 | 92.3 | 94.3 | 95.1 | 95.2 | 94.5 | 94.1 | 93.3 | |
| −100 | 67.5 | 82.3 | 90.1 | 92.1 | 94.2 | 95.3 | 95.0 | 94.4 | 93.8 | | |
| −110 | 66.6 | 81.8 | 89.8 | 92.0 | 94.1 | 95.2 | 94.8 | 94.0 | | | |
| −120 | 65.4 | 81.3 | 89.6 | 91.8 | 93.9 | 95.0 | 94.5 | 94.0 | | | |
| −130 | 63.9 | 80.7 | 89.3 | 91.6 | 93.8 | 94.6 | 94.4 | | | | |
| −140 | 62.4 | 80.0 | 89.0 | 91.4 | 93.6 | 94.5 | | | | | |
| −150 | 61.2 | 79.3 | 88.7 | 91.1 | 93.5 | 94.2 | | | | | |
| −160 | 59.9 | 78.7 | 88.4 | 91.0 | 93.4 | 93.7 | | | | | |
| −170 | 58.2 | 77.9 | 88.0 | 90.7 | 93.1 | | | | | | |
| −180 | 56.7 | 77.2 | 87.6 | 90.4 | 92.9 | | | | | | |
| −190 | 55.4 | 76.5 | 87.3 | 90.1 | 92.8 | | | | | | |
| −200 | 53.8 | 75.8 | 86.9 | 89.9 | 92.7 | | | | | | |
| −210 | 52.0 | 74.9 | 86.5 | 89.5 | | | | | | | |
| −220 | 50.3 | 74.0 | 86.0 | 89.2 | | | | | | | |
| −230 | 48.5 | 73.1 | 85.6 | 88.9 | | | | | | | |
| −240 | 46.6 | 72.2 | 85.1 | 88.5 | | | | | | | |
| −250 | 44.6 | 71.3 | 84.6 | 88.2 | | | | | | | |
| −260 | 42.7 | 70.3 | 84.1 | 87.8 | | | | | | | |
| −270 | 40.7 | 69.3 | 83.7 | 87.4 | | | | | | | |
| −280 | 38.7 | 68.3 | 83.1 | 87.0 | | | | | | | |
| −285 | 37.7 | 67.8 | 82.9 | 86.9 | | | | | | | |

VEHICLE AND METHOD FOR CONTROLLING THE SAME

CROSS-REFERENCES TO RELATED APPLICATIONS

This Application is a Continuation of application Ser. No. 16/543,898 filed on Aug. 19, 2019. Application Ser. No. 16/543,898 claims the benefit of Korean Patent Application No. 10-2019-0008024 filed on Jan. 22, 2019 in the Korean Intellectual Property Office (KIPO), the entire contents of which are incorporated herein by reference in their entirety.

TECHNICAL FIELD

The present disclosure relates to a vehicle and method for controlling the same, and more particularly, to a vehicle and method that perform a two mode and a charging mode to improve user convenience.

BACKGROUND

Generally, vehicles are machines that travel on roads and are equipped with various devices for passenger protection, driving assistance, and ride comfort improvement. The vehicles include motor vehicles (conventional engine-driven vehicles) driven with mechanical power produced by burning fuel oil, such as gasoline and diesel, and eco-friendly vehicles driven by electrical power to reduce the amount of harmful fuel emissions and increase fuel efficiency.

The eco-friendly vehicles include electric vehicles having a rechargeable power unit comprised of a battery and a motor, rotating the motor with electricity charged in the battery, driving the wheels using the rotation of the motor; hybrid vehicles having an engine, a battery, and a motor and driven by adjusting the mechanical power of the engine and the electrical power of the motor; and hydrogen fuel cell vehicles. To use the eco-friendly vehicles, it is essential to develop charging station infrastructure. When charging the battery, the eco-friendly vehicles is unable to travel for a certain period of time while the battery is charging, thereby delaying an arrival time at a destination.

SUMMARY

Therefore, the present disclosure provides a vehicle which performs at least one of a tow mode and a charging mode, charges a battery using regenerative braking when performing the charging mode, and transmits charge information and braking information to another vehicle performing the charging mode when performing the tow mode, and a method of controlling the vehicle.

Another aspect of the present disclosure provides a vehicle configured to transmit selection information of a charge priority mode or an efficiency priority mode to another vehicle, and transmit charge state information to the other vehicle when performing a charging mode, and a method of controlling the vehicle.

Yet another aspect of the present disclosure provides a vehicle which performs charging based on a preset regenerative torque when communication with another vehicle is not connected during a charging mode, adjusts a predetermined regenerative torque based on road information, performs the charging based on the adjusted predetermined regenerative torque, and transmits charging information to a terminal provided in the other vehicle, and a method of controlling the vehicle.

In accordance with one aspect of the present disclosure, a vehicle may include: a battery; a motor configured to rotate a wheel using electric power charged in the battery; a communication device configured to perform communication with other vehicles and a terminal; and a controller configured to execute an operation of the communication device to transmit request information of a charging service when an amount of charge of the battery is equal to or less than a preset amount of charge, and execute charging of the battery based on electric power generated by the motor while using the charging service through one of the other vehicles.

While using the charging service, the controller may be configured to adjust the execution of a charge priority mode when the amount of charge of the battery is less than a predetermined amount of charge, and adjust the execution of an efficiency priority mode when the amount of charge of the battery exceeds the predetermined amount of charge when using the charging service. During the charge priority mode, the controller may be configured to determine a predetermined maximum regenerative torque, and adjust the charging of the battery based on the predetermined maximum regenerative torque.

The vehicle may further include a slope detector configured to detect a slope of a road. The controller may be configured to adjust the identified maximum regenerative torque based on the detected slope, and adjust the charging of the battery based on the adjusted maximum regenerative torque. During the efficiency priority mode, the controller may be configured to maintain a rotational speed of the motor at a reference rotational speed, identify a regenerative torque that corresponds to the reference rotational speed, and adjust the charging of the battery based on the identified regenerative torque.

The vehicle may further include a storage configured to store, as a look-up table, efficiency that corresponds to a traveling speed of the vehicle, an output capability of the motor, and a torque of the motor. During the efficiency priority mode, the controller may be configured to adjust the charging of the battery based on the look-up table stored in the storage. The vehicle may further include a slope detector configured to detect a slope of a road. The controller may be configured to identify a regenerative torque that corresponds to a rotational speed of the motor, adjust the identified regenerative torque based on the detected slope, and adjust the charging of the battery based on the adjusted regenerative torque.

The vehicle may further include a coupling member coupled to a connection member provided on one of the other vehicles. While using the charging service, the controller be configured to start the charging. Additionally, when information of braking power is received by the one of the other vehicles, the controller may be configured to determine additional braking power from the received information, and adjust regenerative braking of the motor based on the identified additional braking power. When a regenerative torque corresponding to regenerative capability of the one of the other vehicles is received by the one of the other vehicles, the controller may be configured to identify the regenerative torque of the motor for charging the battery, and operate the communication device such that information of a smaller torque among the regenerative torque of the motor and the received regenerative torque is transmitted to the one of the other vehicles.

When provision request information of the charging service is received by another vehicle, the controller may be configured to determine a required torque for traveling, when a regenerative torque of the motor is received by another vehicle, obtain a traveling torque based on the received regenerative torque and the required torque, and adjust an operation of the motor based on the obtained traveling torque. When provision request information of the charging service is received by another vehicle, the controller may be configured to operate the communication device to transmit a regenerative torque corresponding to regenerative capability in the vehicle to another vehicle.

When the amount of charge of the battery is a reference amount of charge while using the charging service, the controller may be configured to determine that the charging of the battery is completed, and operate the communication device to transmit charging completion information to the other vehicle. When communication with one of the other vehicles is not connected while using the charging service, the controller may be configured to determine that the charging of the battery is completed, and operate the communication device to transmit charging completion information to a terminal provided in the one of the other vehicles.

In accordance with another aspect of the present disclosure, a vehicle may include: a battery; a motor configured to rotate a wheel using electric power charged in the battery; a coupling member coupled to a connection member provided on another vehicle; and a controller configured to execute start-up when using a charging service, adjust charging of the battery based on electric power generated by the motor, and when adjusting the charging, adjust the charging of the battery based on a reference regenerative torque.

The vehicle may further include a slope detector configured to detect a slope of a road; and a communication device configured to perform communication with a terminal provided in the other vehicle. The controller may be configured to adjust the reference regenerative torque based on the detected slope, and adjust the charging of the battery based on the adjusted reference regenerative torque. When communication with the other vehicle is not connected while using the charging service, the controller may be configured to identify an amount of charge of the battery, when the identified amount of charge is a reference amount of charge, determine that the charging of the battery is completed, and operate the communication device to transmit charging completion information to the terminal.

In accordance with another aspect of the present disclosure, a method for controlling a vehicle having a motor and a battery may include: transmitting provision request information of a charging service when an amount of charge of the battery is less than or equal to a preset amount of charge; and charging the battery using power generated in the motor while traveling by the power of another vehicle.

The charging of the battery may include: executing a charge priority mode when the amount of charge of the battery is less than a predetermined amount of charge; and executing an efficiency priority mode, when the amount of charge of the battery exceeds the predetermined amount of charge. The executing of the charge priority mode may include: identifying a predetermined maximum regenerative torque, and adjusting the charging of the battery based on the predetermined maximum regenerative torque. The executing of the efficiency priority mode may include: maintaining a rotational speed of the motor at a reference rotational speed, identifying a regenerative torque corresponding to the reference rotational speed, and adjusting the charging of the battery based on the identified regenerative torque. The charging of the battery may include: detecting a slope of a road; adjusting a regenerative torque based on the detected slope, and adjusting the charging of the battery based on the adjusted regenerative torque.

The method may further include: performing a tow mode when provision request information of the charging service is received by another vehicle; identifying a required torque for traveling; when a regenerative torque of the motor is received by another vehicle, obtaining a traveling torque based on the received regenerative torque and the required torque; and adjusting an operation of the motor based on the obtained traveling torque.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 6B shows a braking efficiency table corresponding to rotational speed and torque of the motor provided in the vehicle according to an exemplary embodiment:

DETAILED DESCRIPTION

Figure 1:
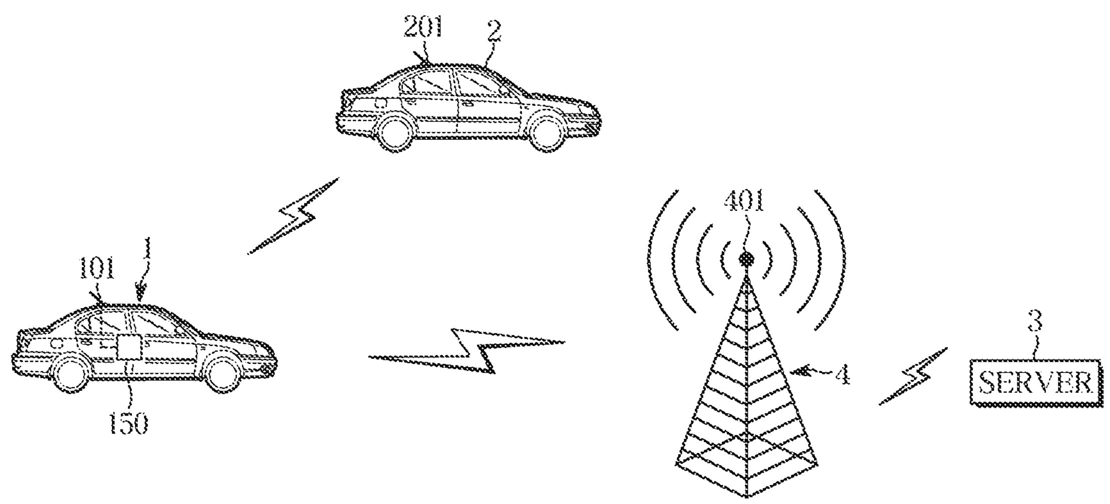
FIG. 1 is an exemplary view illustrating communication of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following description, like reference numerals refer to like elements throughout the specification. Well-known functions or constructions are not described in detail since they would obscure one or more exemplar embodiments with unnecessary detail. Terms such as "unit," "module," "device" and "apparatus" may be embodied as hardware or software. According to embodiments, a plurality of "units," "modules," "devices" and "apparatuses" may be implemented as a single component or a single "unit," "module," "device" and "apparatus" may include a plurality of components.

It will be understood that when an element is referred to as being "connected" to another element, it can be directly or indirectly connected to the other element, wherein the indirect connection includes connection via a wireless communication network. An identification code is used for convenience of the description but is not intended to illustrate the order of each step. Each of the steps may be implemented in an order different from the illustrated order unless the context clearly indicates otherwise.

Reference will now be made in detail to exemplary embodiments of the present disclosure, examples of which are illustrated in the accompanying drawings. FIG. 1 is an exemplary view illustrating communication of a vehicle according to an exemplary embodiment. FIG. 1 is a view illustrating communication between a user's own vehicle 1 (hereinafter referred to as vehicle, first vehicle, or subject vehicle) and at least one other vehicle 2 (hereinafter referred to as a second vehicle or the other vehicle) and communication between the vehicle 1, a server 3, and infrastructure 4.

The vehicle 1 may be configured to radiate electromagnetic waves to the outside through an antenna 101. In particular, the antenna 101 may be configured to emit an electromagnetic wave that corresponds to electrical signals transmitted from a controller 150 provided in the vehicle 1. The other vehicle 2 may be configured to receive the electromagnetic wave emitted through the antenna 101 of the vehicle 1 via an antenna 201. At this time, the other vehicle 2 may be configured to receive the electromagnetic wave emitted from the vehicle 1 through the antenna 201, convert the received electromagnetic wave into an electrical signal, and generate a control signal that corresponds to the electrical signal, thereby using the control signal for operating the other vehicle 2.

The other vehicle 2 may be configured to generate the electrical signal based on the control signal transmitted from a controller (not shown) of the other vehicle 2 via the antenna 201 and emit the electromagnetic wave that corresponds to the electrical signal. The vehicle 1 may be configured to receive an electromagnetic wave emitted from the other vehicle 2 through the antenna 101, and convert the received electromagnetic wave into an electrical signal.

A drive module of the antenna 101 of the vehicle 1 may be configured to demodulate the received electromagnetic wave, convert the electromagnetic wave into the electrical signal and transmit the electrical signal to the controller 150. At this time, the controller 150 of the vehicle 1 may be configured to generate the control signal that corresponds to the electrical signal and use the control signal for operating the vehicle 1.

The vehicle 1 may be configured to perform communication with another vehicle (e.g., V2V communication). In addition, the vehicle 1 may be configured to perform communication with the server 3. The server 3 may be a server provided in at least one of a service center that manages the vehicle 1 and the other vehicle 2, a manufacturer, a technology supply and repair center, and a charge management center. The server 3 may be an application (i.e., an app) server that provides a service associated with the vehicle 1 and the other vehicle 2. The vehicle 1 may be configured to communicate with the server 3 via the infrastructure 4 of a road.

Additionally, the vehicle 1 may be configured to receive an electromagnetic wave emitted from the infrastructure 4 on the road or emit an electromagnetic wave to the infrastructure 4 on the road. The infrastructure 4 may be configured to receive the electromagnetic wave emitted from the antenna 101 of the vehicle 1 through an antenna 401, and obtain information provided from the vehicle 1 or generate a control signal using an electrical signal that corresponds to the received electromagnetic wave.

A controller (not shown) of the infrastructure 4 may be configured to transmit the electrical signal, the control signal generated according to the electrical signal, and the information obtained based on the electrical signal, to the external server 3 via a separate cable. The controller of the infrastructure 4 may allow the generated control signal or information to be emitted as an electromagnetic wave through the antenna 401. At this time, a vehicle in the vicinity of the infrastructure 4 may be configured to receive the electromagnetic wave emitted from the infrastructure 4.

The infrastructure 4 may be configured to emit electromagnetic waves that may be received by only one vehicle based on a control command of the server 3. In other words, the antenna 101 of the vehicle 1 may be configured to receive the electromagnetic wave transmitted from the antenna 401 of the infrastructure 4. The controller 150 of the vehicle 1 may be configured to operate the display of the vehicle 1 by generating the control signal for a variety of components of the vehicle 1, such as a display of the vehicle 1, based on an electrical signal that corresponds to the received electromagnetic wave. Therefore, the controller 150 of the vehicle 1 may be configured to operate the display to output information that corresponds to the electrical signal. Accordingly, it may be possible to perform vehicle to infrastructure (V2I) communication between the vehicle 1 and the infrastructure 4 (i.e., the structure).

Figure 2:
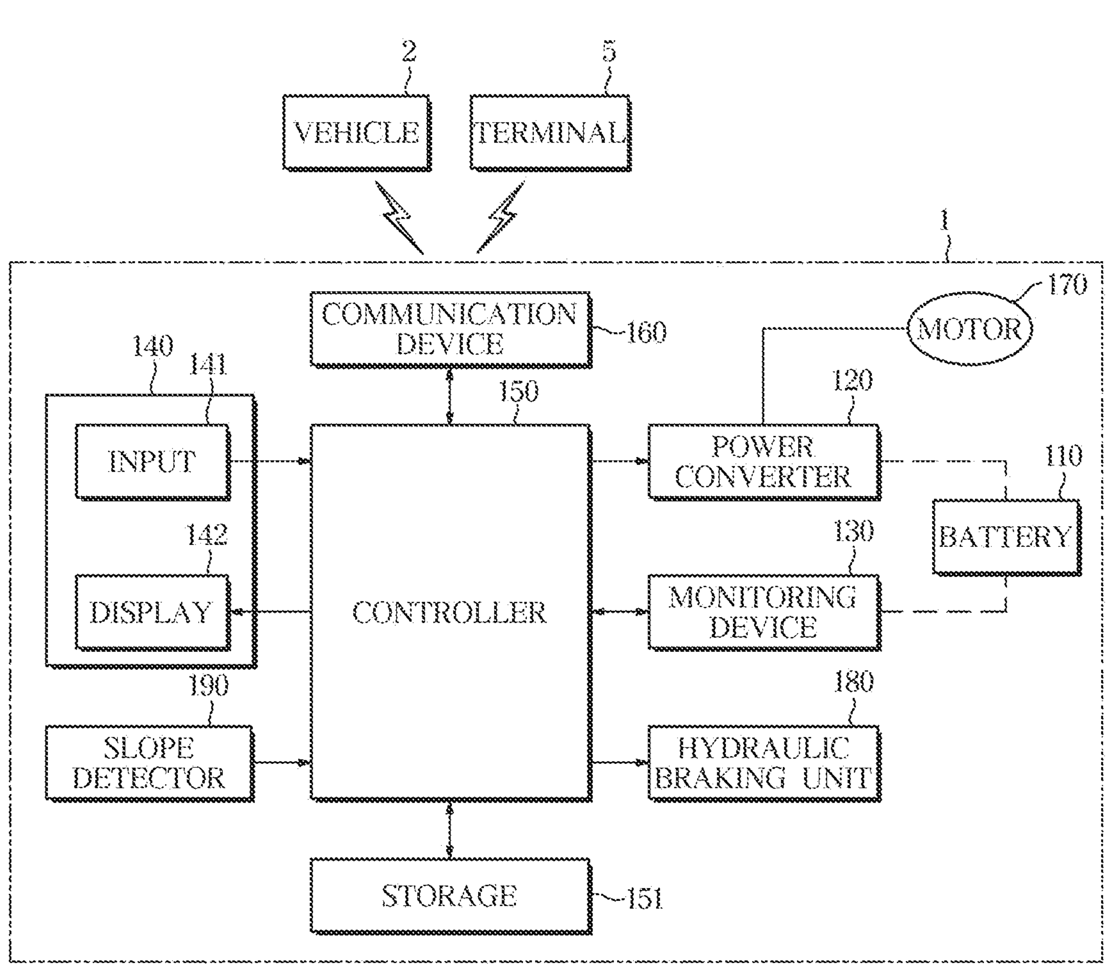
FIG. 2 is a block diagram illustrating the vehicle according to an exemplary embodiment.

The exemplary embodiment describes an electric vehicle having a battery and a motor. FIG. 2 is a block diagram illustrating the vehicle according to an exemplary embodiment. As illustrated in FIG. 2, the vehicle 1 may include a battery 110, a power converter 120, a monitoring device 130, a terminal 140, the controller 150, a storage 151, a communication device 160, a motor 170 and a slope detector 190.

The battery 110 may be configured to supply driving power to the motor 170, and may be electrically connected to the motor 170. The battery 110 may be electrically connected to the terminal, an audio device, a lamp, and other electronic devices to supply driving electric power to the respective electronic devices. The battery 110 may be a battery capable of charging and discharging. One or two batteries may be provided in the vehicle.

For example, the vehicle 1 may include a first battery configured to supply driving power to a powertrain including the motor 170 and the like, and a second battery configured to supply driving power to electronic devices such as convenience devices, additional devices and the like. An output voltage of the first battery may be equal to an output voltage of the second battery or may be greater than the output voltage of the second battery. The first battery may be charged by electric power generated by the motor 170 performing the power generation function during regenerative braking, and the second battery may be charged by the electric power charged in the first battery. The second battery may be charged by the electric power generated by the motor 170.

The exemplary embodiment will be described for charging the first battery (hereinafter referred to as "battery"). The power converter 120 may be configured to convert electric power supplied from the outside into electric power for charging the battery 110, and supply the converted electric power to the battery 110. The electric power supplied from the outside may be electric power of a charging station or electric power of a commercial power source. The power converter 120 may be configured to convert the electric power generated by the motor to the electric power for charging the battery 110 by the rotation of the motor 170.

The power converter 120 may include a booster, at least one converter, and an inverter. When external alternating current (AC) power is received, the booster may be configured to rectify the received AC power, boost rectified direct current (DC) power to DC power suitable for charging the battery 110, and supply the boosted DC power to the battery 110 to charge the battery 110. The external AC power source may be an AC power source of the charging station. The converter may be configured to boost DC power of the battery 110 for output increase and efficiency of the motor 170. The converter may be configured to convert the DC power charged in the battery 110 into DC power above a predetermined power.

For example, when an AC voltage of about 220V is converted to a DC voltage of 72V to charge the battery using the booster, the converter may be configured to convert the DC voltage of about 72V output from the battery 110 to a DC voltage of 300V. The converter may be omitted based on the output power of the battery, the driving power of the motor, and capability of the inverter. When the second battery is provided in the vehicle, the power converter may further include a converter configured to convert DC power of the first battery into DC power suitable for charging the second battery, and supply the converted DC power to the second battery to charge the second battery. When the output voltages of first and second batteries 111 and 112 are the same, the converter for converting power to charge the second battery may be omitted.

When the output voltages of the first and second batteries are different, the controller may be configured to convert electric power output from the first battery into electric power for charging the second battery controlling a pulse width modulation of a switching element in the converter for converting the charging power of the first battery. The inverter 121 may be configured to convert a DC voltage into an AC voltage that corresponds to the output voltage received by the power converter, and apply the converted AC voltage to the motor 170. The inverter 121 may be configured to convert the electric power of the battery 110 into the driving power of the motor 170.

The inverter 121 may be configured to transmit the regenerative energy of the motor 170 to the battery 110 during regenerative braking of the vehicle to charge the battery 110. At this time, the inverter 121 may be configured to perform a boosting function. The inverter 121 may be a bidirectional DC/AC inverter. In addition, the inverter 121 may include a plurality of switch elements, and may further include a capacitor and a rectifier. The monitoring device 130 may be configured to monitor a state of charge of the battery 110 and transmit charging state information that corresponds to the monitored state of charge to the controller 150. The monitoring device 130 may include a detector (not shown) configured to detect the state of charge of the battery.

In particular, the detector may include a current detector configured to detect a current of the battery 110 and may further include a voltage detector configured to detect a voltage of an output terminal of the battery 110, and a temperature detector configured to detect a temperature of the battery 110. The monitoring device 130 may be configured to monitor the state of charge (SOC) of the battery based on the detected current of the battery.

The monitoring device 130 may further be configured to monitor the state of charge of the battery based on the detected current and voltage of the battery. In addition, the monitoring device 130 may be configured to monitor the state of charge (SOC) of the battery based on the detected current, voltage, and temperature of each cell of the battery. The monitoring device 130 may then be configured to output the charging state information regarding the monitored state of charge of the battery to the controller 150. The state of charge of the battery 110 may include an amount of charge of the battery. The monitoring device 130 may be configured to store a charge level that corresponds to the current of the battery 110 and store a predetermined level of the battery.

In other words, the monitoring device 130 may be configured to identify the charge level that corresponds to the detected current based on the stored charge level, when the identified charge level is the predetermined level, generate a trigger signal, and transmit the generated trigger signal to the controller 150. The trigger signal may be a signal for notifying the necessity of charging the battery 110.

The monitoring device 130 may be configured to store the charge level that corresponds to the amount of charge of the battery. In other words, the monitoring device 130 may be configured to obtain the amount of charge of the battery that corresponds to the detected current, voltage, and temperature of the battery based on a pre-stored table. The pre-stored table may have information that matches the amount of charge of the battery corresponding to a correlation between the current, voltage and temperature of the battery. The monitoring device 130 may be configured to periodically identify the state of charge of the battery 110, and output the charging state information that corresponds to the state of charge of the battery to the controller 150.

The terminal 140 is a terminal for the vehicle provided inside the vehicle. The terminal 140 may be configured to perform at least one function selected by the user among an audio function, a video function, a navigation function, a broadcast function, a radio function, a content playback function, an Internet search function, a map display function, a telephone function, and a text message service function. The terminal 140 may be disposed on a dashboard as a mounted type or disposed on the dashboard as an embedded type. The terminal 140 may include a display panel as a display, and may further include a touch panel as an input.

In other words, the terminal 140 may include only the display panel, and the display panel may include a touch screen integrated with the touch panel. When the terminal 140 is implemented with only the display panel, a button displayed on the display panel may be selected using an input (not shown) provided in a center fascia. When the terminal 140 is implemented as the touch screen, the terminal 140 may directly receive the user's operation command through the touch panel. As described above, the terminal 140 may include a display 142 and may further include an input 141.

The input 141 may be configured to receive an on/off command of at least one function among a plurality of functions, and receive an operation command for at least one input function. For example, the input 141 may be configured to receive at least one of a radio function, an audio function, a video function, a map display function, a navigation function, a broadcast function, a content playback function, and an Internet search function. The input 141 may be configured to receive destination information from the user when a navigation mode is selected to perform the navigation function. The input 141 may additionally be configured to receive a communication-on command and a communication-off command with the server 3.

Further, the input 141 may be configured to receive an on/off command for a charging service mode. The charging service mode is a default mode and may be performed automatically. The input 141 may be configured to receive a provision request command of a charging service for using the charging service provided by another vehicle, and receive service cost information for the charging service. The input 141 may then be configured to receive an acceptance command for transmission of provision request information of the charging service automatically indicated by operating the controller 150. Additionally, the input 141 may be configured to receive an acceptance command or a rejection command that corresponds to a tow mode for providing the charging service to another vehicle.

The display 142 may be configured to display operation information regarding a function being performed in the vehicle. For example, the display 142 may be configured to display information related to a telephone call, display information of contents output via the terminal 140, display information related to music playback, and display external broadcast information. When the navigation mode is performed, the display 142 may be configured to display a route from a current position to a destination, and display route guidance information. The display 142 may further be configured to display communication state information with the server 3 and display the charging state information of the battery 110.

The charging state information of the battery 110 may include the amount of charge of the battery, the charge level that corresponds to the amount of charge of the battery, and may further include charging completion information. The charging completion information may be information that corresponds to the amount of charge that may be transferred to the destination and information that corresponds to a full charge.

The communication state information with the server 3 may include information of a state in which communication with the server is possible, and information of a state in which communication with the server is impossible. The state in which communication with the server is possible includes a state in which the vehicle 1 and the server 3 are connected by communication. The state in which communication with the server is impossible includes a state in which the vehicle 1 and the server 3 are not connected by communication.

Figure 3A:
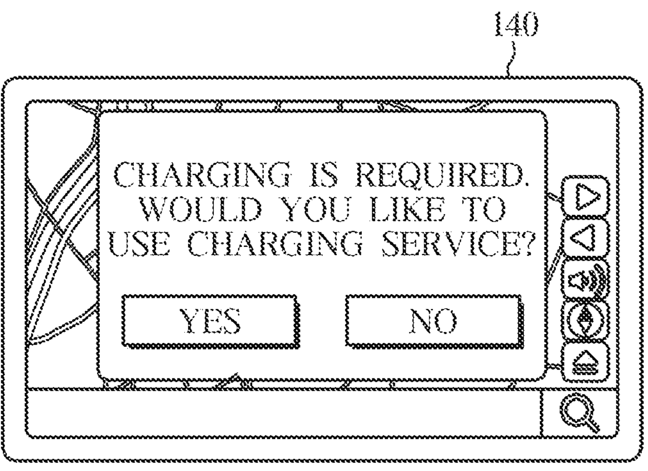
FIGS. 3A-3B are exemplary views illustrating a display provided in the vehicle according to an exemplary embodiment.
Figure 3B:
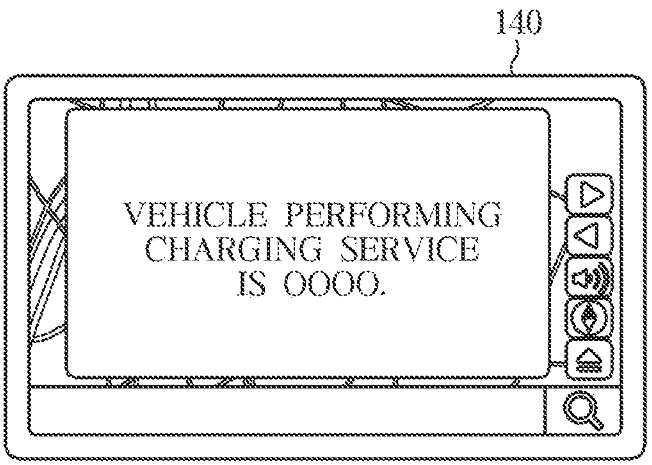

The display 142 may be configured to display a changed destination when using the charging service and display a route to the changed destination. The changed destination may be a place to meet with the other vehicle using the charging service. As illustrated in FIG. 3A, the display 142 may be configured to display usage information of the charging service for charging the vehicle. As illustrated in FIG. 3B, the display 142 may be configured to display information of the other vehicle using the charging service. The information of the other vehicle may include a license plate number, a vehicle type, a color, and the like.

Additionally, the display 142 may be configured to display braking information, slope information and regeneration torque control information that corresponds to the slope information during the execution of a charging mode. The display 142 may be configured to display a charge priority mode or an efficiency priority mode being executed in the vehicle. The display 142 may also be configured to display efficiency input information when the charging efficiency mode is executed.

When the vehicle is connected to a commercial AC power source, the controller 150 may be configured to execute an ON/OFF operation of switch elements in the booster to charge the battery, and the motor 170 may be driven by operating the power converter and the inverter while the vehicle is being driven. When an accelerator pedal is pressed or engaged, the controller 150 may be configured to operate the motor 170 to drive the vehicle. When the vehicle is a hybrid vehicle, the controller 150 may be configured to operate at least one of an engine (not shown) and the motor 170 in response to the engagement of the accelerator pedal, thereby allowing the vehicle to travel.

The controller 150 may be configured to decrease a rotational speed of the motor 170 when the accelerator pedal is released from a pressurized state (e.g., disengaged). When the vehicle is a hybrid vehicle, the controller 150 may be configured to operate and adjust at least one of the engine and the motor, in response to determining that both a brake pedal and the accelerator pedal are disengage, and operate the power converter 120 to convert kinetic energy remaining of the vehicle during the operation of at least one of the engine and the motor to electrical energy, thereby allowing the battery 110 to be charged.

The controller 150 may be configured to operate the motor so that power acting on the motor 170 acts in a reverse direction when the brake pedal is pressed or engaged, so that the motor 170 may be operated as a generator. When the vehicle is a hybrid vehicle, the controller 150 may be configured to obtain braking power required by a driver based on a speed at which the brake pedal is depressed and an amount by which the brake pedal is depressed when pressurization information of the brake pedal is received, perform reference regenerative braking within a range of the obtained braking power and operate a hydraulic braking unit to compensate for the remaining braking power through the operation of the hydraulic braking unit.

Further, the controller 150 may be configured to decelerate the vehicle using the motor 170 when the braking power less than the reference regenerative braking power is required, and operate the hydraulic braking device when the braking power equal to or greater than the reference regenerative braking power is required. In response to determining that neither the brake pedal nor the accelerator pedal is engaged, the communication device 160 may be configured to determine that the vehicle is coasting, then determine a target regenerative torque based on the rotational speed of the motor and a slope of the road, and operate the motor 170 based on the target regenerative torque. The target regenerative torque may be less than a reference regenerative torque.

At this time, when the regenerative torque is generated by the motor 170, the battery may be charged. The regenerative torque is a torque of the motor that charges the battery 110, and corresponds to regenerative braking power during regenerative braking. Specifically, when the motor 170 is used to generate braking power, the controller 150 may be configured to operate the motor 170 as a generator by cutting off power applied to the motor 170, and operate the inverter 121 to have a current applied to the motor 170 flowing in the reverse direction to operate the motor 170 as the generator. The rotation direction of the motor 170 is not changed due to the inertial force.

The controller 150 may be configured to receive the charging state information that corresponds to the state of charge of the battery by the monitoring device 130, determine whether the charging of the battery is required based on the charging state information in response to determining that charging of the battery is required, transmit the provision request information to the server 3 and the other vehicle 2. The charging state information of the battery may include the amount of charge of the battery.

When the amount of charge of the battery is less than a preset amount of charge, the controller 150 may be configured to determine that charging of the battery is required. The preset amount of charge may be an amount of charge that corresponds to a discharge threshold level. When the trigger signal is received from the monitoring device 130, the controller 150 may be configured to determine that charging of the battery is required. When the trigger signal is received by the monitoring device 130, the controller 150 may be configured to automatically transmit the provision request information to the server 3 and the other vehicle 2. The other vehicle 2 may be a vehicle traveling at a position adjacent to the vehicle 1, and may be a vehicle capable of communicating with the vehicle 1.

In response to determining that charging of the battery is required, the controller 150 may be configured to operate the display 142 to output charging of necessity information. When the charging of necessity information is received by the input 141, the controller 150 may be configured to operate the communication device 160 to transmit the provision request information corresponding to the charging of necessity information to the server 3 and the other vehicle 2.

When providing information of the charging service of the other vehicle corresponding to the provision request information of the vehicle 1 is received, the controller 150 may be configured to operate the display 142 to display information of the other vehicle providing the charging service, operate the display 142 to display information of a contact position to meet with the other vehicle 2, change a destination based on the contact position, generate a route from a current position to the changed destination based on information of the current position and information of the changed destination, and operate the display 142 to display the generated route.

The controller 150 may be configured to execute the charging mode when the charging service is provided by the other vehicle, and execute the tow mode when providing the charging service to the other vehicle. When the provision request information of the charging service is received by the other vehicle, the controller 150 may be configured to display information that corresponds to the charging service, when the acceptance command is received by the input 141, transmit acceptance information that corresponds to the acceptance command to the server or the other vehicle, and when the rejection command is received by the input 141, transmit rejection information that corresponds to the rejection command to the server or the other vehicle.

When the acceptance command is received by the input 141, the controller 150 may be configured to operate the display 142 to display the information of the other vehicle requesting the charging service, operate the display 142 to display information of a contact position to meet with the other vehicle, change a destination based on the contact position, generate a route from a current position to the changed destination based on information of the current position and information of the changed destination, and operate the display 142 to display the generated route.

(1) When the vehicle performs the charging mode, the configuration of the controller 150 will be described.

Figure 4:
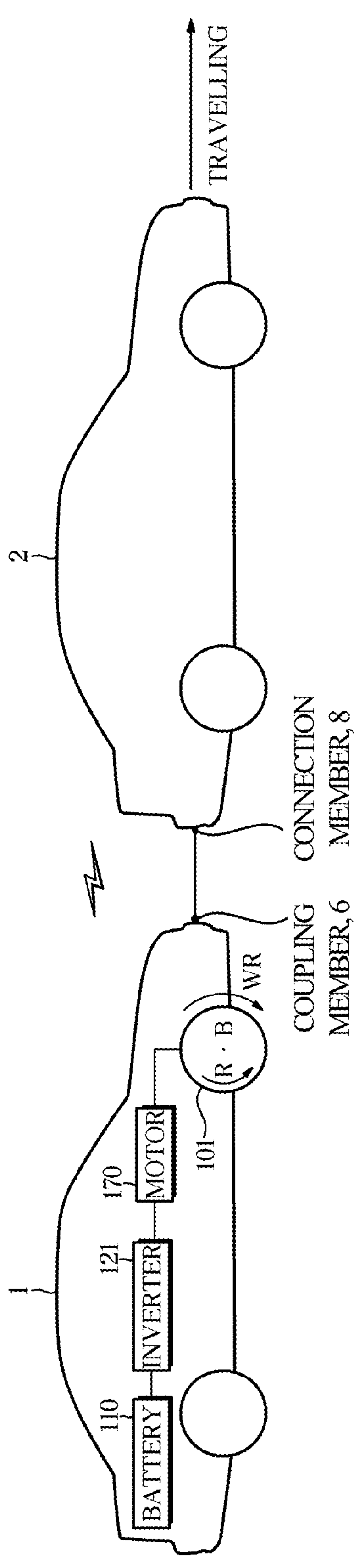
FIGS. 4 and 5 are exemplary views illustrating a charging service of the vehicle according to an exemplary embodiment.

As illustrated in FIG. 4, the vehicle 1 may be towed by the other vehicle 2 when executing the charging mode. Each of the vehicle 1 and the other vehicle 2 includes a coupling member 6 and a connection member 8. When the charging service is used, the vehicle 1 and the other vehicle 2 may be connected by the coupling member 6 and the connection member 8 provided in each of the vehicles. As a result, the two vehicles 1 and 2 may travel at a certain distance from each other.

The vehicle 1 may be in an ON state in the charging mode. The other vehicle 2 may perform the tow mode with a vehicle that accepts the request to provide the charging service in response to the transmission of the charging of necessity information of the vehicle 1. The other vehicle 2 may be engine-driven vehicles or eco-friendly vehicles. The other vehicle 2 may be a vehicle capable of performing communication or a vehicle not performing communication. The other vehicle 2 may be a vehicle having a communication function or a vehicle having no communication function. When the vehicle 1 is towed by the other vehicle 2, wheels of the vehicle 1 may rotate, at which time a regenerative torque may be generated and the battery may be charged by the generated regenerative torque.

Figure 5:
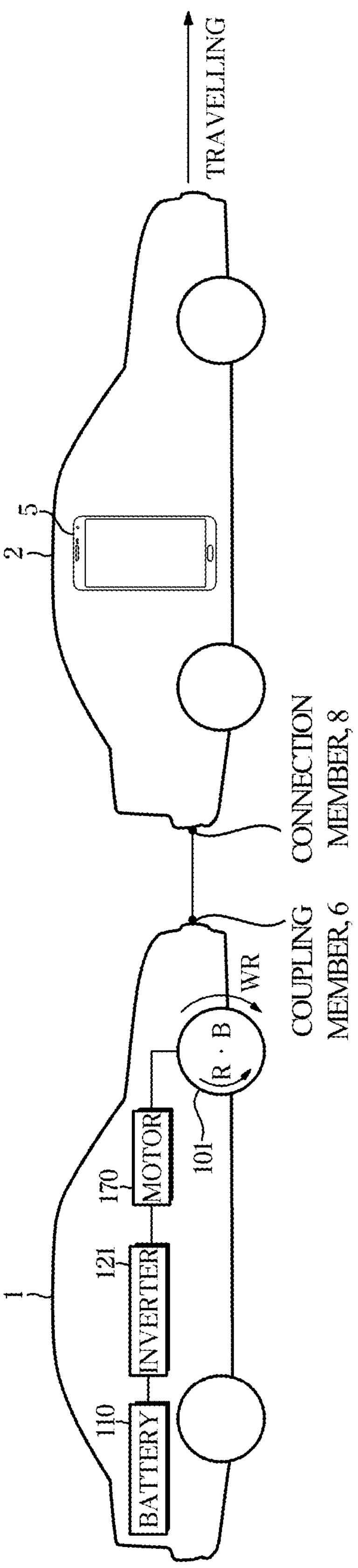

As illustrated in FIG. 5, if the other vehicle 2 is a vehicle that cannot communicate with the vehicle 1, the request to provide the charging service may be received via a terminal 5 provided in the other vehicle 2. At this time, the vehicle 1 may be configured to perform communication with the terminal 5 of an owner of the other vehicle 2.

(1.1) The configuration of the controller 150 of the vehicle 1 when the vehicle 1 and the other vehicle 2 are connected via communication will be described.

The controller 150 of the vehicle 1 may be configured to determine the state of charge of the battery before entering the charging mode, and determine the amount of charge that corresponds to the state of charge, when the identified amount of charge is equal to or less than a predetermined amount of charge, transmit information of the charge priority mode to the other vehicle 2, and execute the charge priority mode.

When the identified amount of charge exceeds the predetermined amount of charge, the controller 150 may be configured to transmit information of the efficiency priority mode to the other vehicle 2, and execute the efficiency priority mode When the efficiency priority mode is executed, the controller 150 may be configured to determine a maximum regenerative torque in a look-up table stored in the storage 151, and transmit the identified maximum regenerative torque to the other vehicle 2 with the regenerative torque of the vehicle 1.

When the efficiency priority mode is executed, the controller 150 may be configured to determine a rotational speed of the motor that corresponds to a travelling speed of the vehicle detected by a speed detector (not shown), determine the regenerative torque that corresponds to the detected rotational speed of the motor, and transmit the identified regenerative torque to the other vehicle 2. When the efficiency priority mode is executed, the controller 150 may be configured to obtain a rotational speed of the motor based on information detected by the rotational speed detector (not shown) provided in the motor 170.

When the efficiency priority mode is executed, the controller 150 may be configured to operate the display to display input request information for the charging efficiency through the display 142. For example, the controller 150 may be configured to operate the display to display a high button and a low button of charging efficiency, and operate the display to display input guide information of a numerical value of the charging efficiency. When the high button is received by the input 141, the controller 150 may be configured to determine that the input charging efficiency is equal to or greater than a reference efficiency and adjust the torque of the motor. When the low button is received by the input 141, the controller 150 may be configured to determine that the input charging efficiency is less than the reference efficiency and adjust the rotational speed of the motor.

When the numerical value of the charging efficiency is received by the input 141, the controller 150 may be configured to determine whether the input numerical value of the charging efficiency is equal to or greater than a reference numerical value corresponding to the reference efficiency. In response to determining that the input numerical value is equal to or greater than the reference numerical value, the controller 150 may be configured to adjust the torque of the motor. In response to determining that the input numerical value is less than the reference numerical value, the controller 150 may be configured to adjust the rotational speed of the motor.

When adjusting the torque of the motor, the controller 150 may be configured to adjust the torque to the other vehicle 2 with a regenerative torque. When adjusting the rotational speed of the motor, the controller 150 may be configured to determine a torque that corresponds to the rotational speed of the motor and the input charging efficiency, and transmit the identified torque to the other vehicle 2 with a regenerative torque. When the efficiency priority mode is executed, the controller 150 may be configured to identify a regenerative torque transmitted by the other vehicle and a regenerative torque that corresponds to the rotational speed of the motor 170, identify a smaller regenerative torque among the regenerative torque transmitted by the other vehicle and the regenerative torque that corresponds to the rotational speed of the motor 170, and transmit information that corresponds to the identified regenerative torque to the other vehicle 2.

When the charge priority mode is executed, the controller 150 may be configured to identify the regenerative torque transmitted by the other vehicle and the maximum regenerative torque of the vehicle, identify a smaller regenerative torque among the regenerative torque transmitted by the other vehicle and the maximum regenerative torque of the vehicle, and transmit information that corresponds to the identified regenerative torque to the other vehicle 2.

The regenerative torque transmitted by the other vehicle may be information stored in the other vehicle 2. The controller 150 may be configured to adjust the charging of the battery based on the identified regenerative torque. In addition, the controller 150 may be configured to adjust the identified regenerative torque based on the slope of the road detected by the slope detector 190, and transmit the adjusted regenerative torque to the other vehicle. The controller 150 may be configured to adjust the identified regenerative torque based on the slope of the road detected by the slope detector 190 and the travelling speed of the vehicle, and transmit the adjusted regenerative torque to the other vehicle.

During the execution of the charging mode, the controller 150 may be configured to adjust the identified regenerative torque based on the slope of the road detected by the slope detector 190 and the travelling speed of the vehicle, and operate the power converter to charge the battery based on the adjusted regenerative. The controller 150 may be configured to receive information regarding the slope of the road from the other vehicle 2. During the execution of the charge priority mode, the controller 150 may be configured to change the efficiency priority mode when the charged amount of the battery exceeds the predetermined amount of charge. When information regarding additional braking power is received by the other vehicle, the controller 150 may be configured to identify the braking power additionally required in the vehicle, and adjust at least one of the regenerative braking of the motor 170 and the hydraulic braking of a hydraulic braking unit 180 to generate the additionally required braking power.

During the execution of the charging mode, the controller 150 may be configured to compare the charged amount of the battery with the reference amount of charge, determine that the charging is completed when the charged amount of the battery is the reference amount of charge, and transmit information regarding completion of charging to the other vehicle 2. The reference amount of charge may be a maximum charging amount of the battery, and the charging amount when the battery is fully charged. During the execution of the charging mode, the controller 150 may be configured to identify a required amount of charge for moving to the destination, compare the charged amount of the battery with the required amount of charge, and determine that the charging is completed when the charged amount of charge is equal to or greater than the required amount of charge.

(1.2) The configuration of the controller 150 of the vehicle 1 will be described when the vehicle 1 and the other vehicle 2 are not connected by communication. For example, the other vehicle 2 may not have a communication function or may be in a state where the communication device has failed.

When executing the charging mode without communication with the other vehicle 2, the controller 150 may be configured to operate the power converter 120 based on a reference regenerative torque to charge the battery. When executing the charging mode without communication with the other vehicle 2, the controller 150 may be configured to adjust the reference regenerative torque based on the slope of the road detected by the slope detector 190 and the travelling speed of the vehicle, and operate the power converter 120 based on the adjusted reference regenerative torque to charge the battery.

For example, when the slope of the road is equal to or greater than a first reference slope, the controller 150 may be configured to decrease the reference regenerative torque by a value that corresponds to the slope of the road, and when the slope of the road is less than a second reference slope, increase the reference regenerative torque by a value that corresponds to the slope of the road. The first reference slope may be a slope for determining an uphill road, and the second slope may be a slope for determining a downhill road.

In response to determining that the communication with the other vehicle is not connected, the controller 150 may be configured to execute the communication with the terminal 5 of the owner of the other vehicle, and transmit the reference regenerative torque to the terminal 5 located in the other vehicle 2. The controller 150 may be configured to receive a regenerative torque that may be regenerated by the other vehicle from the terminal 5 located in the other vehicle 2.

When executing the charging mode without communication with the other vehicle 2, the controller 150 may be configured to compare the charged amount of charge of the battery with the reference amount of charge, determine that the charging is completed when the charged amount of charge of the battery is the reference amount of charge, and transmit information on completion of charging to the terminal 5 located in the other vehicle 2

(2) When the vehicle 1 executes the tow mode, the configuration of the controller 150 will be described.

When the vehicle 1 executes the tow mode, the vehicle 1 may pull the other vehicle 2. The other vehicle 2 may execute the charging mode with a vehicle using the charging service in response to the transmission of the acceptance information of the charging service of the vehicle 1. The other vehicle 2 may be an eco-friendly vehicle. When the charging service is used, the vehicle 1 and the other vehicle 2 may be connected by the coupling member 6 and the connection member S provided in each of the vehicles. As a result, the two vehicles 1 and 2 may travel at a certain distance from each other.

When the regenerative torque is received by the other vehicle during the tow mode, the controller 150 may be configured to obtain a traveling torque based on the received regenerative torque, and adjust the driving of the motor based on the obtained traveling torque. The traveling torque may be a torque that is a sum of a torque required for driving the vehicle and a regenerative torque for charging the battery of the other vehicle. The torque required for driving the vehicle may be determined by a pressure applied by the accelerator pedal and the traveling speed of the vehicle, and may be determined by a pressure applied by the brake pedal and the traveling speed of the vehicle.

For example, w the vehicle is a hybrid vehicle will be described. When the regenerative torque is received by the other vehicle during the execution of the tow mode, the controller 150 may be configured to obtain the traveling torque based on the received regenerative torque, and operate at least one of the motor and the engine based on the traveling torque. For example, the case where the vehicle is an engine-driven vehicle will be described. When the regenerative torque is received by the other vehicle during the execution of the tow mode, the controller 150 may be configured to obtain the traveling torque based on the received regenerative torque, and adjust the operation of the engine based on the obtained traveling torque.

The controller 150 may be configured to operate at least one of the motor and the hydraulic braking unit to perform braking when the brake pedal is engaged. When performing the braking, the controller 150 may be configured to obtain braking power requested by the driver based on a pressure applied by the brake pedal, identify the braking power that may be generated in the vehicle in the required braking power. When the required braking power is greater than the braking power that may be generated, the controller 150 may be configured to obtain an additional braking power that corresponds to the difference between the required braking power and the braking power that may be generated, and transmit the obtained additional braking power to the other vehicle 2.

The braking power that may be generated in the vehicle may be braking power obtained by summing braking power by the regenerative braking of the motor and braking power by the hydraulic braking unit. The controller 150 may be configured to transmit the traveling torque of the vehicle to the other vehicle 2. In addition, the controller 150 may be configured to transmit a regenerative torque of the vehicle to the other vehicle in response to determining that communication with the other vehicle is possible. The controller 150 may be configured to adjust the traveling of the vehicle based on a pre-stored reference regeneration torque in response to determining that communication with the other vehicle is impossible.

The controller 150 may be configured to terminate the charging service when the charging completion information is received by the other vehicle. When communication with the other vehicle is impossible and the charging completion information is received by the input, the controller 150 may be configured to terminate the charging service. When the charging service is completed, the controller 150 may be configured to identify an execution time of the charging service, obtain the service cost based on the identified execution time, identify a distance traveled during the charging service, and obtain the service cost based on the identified distance.

Furthermore, the storage 151 may be configured to store the preset amount of charge for determining the necessity of charging the battery, and store a predetermined amount of charge for selecting one of the charge priority mode and the charge efficiency mode. The storage 151 may be configured to store the reference charge amount for determining completion of charging of the battery. The storage 151 may also be configured to store the preset regenerative torque. The storage 151 may be configured to store a look-up table having an efficiency that corresponds to the correlation between the rotational speed of the motor, the output power of the motor, and the torque of the motor.

Figure 6A:
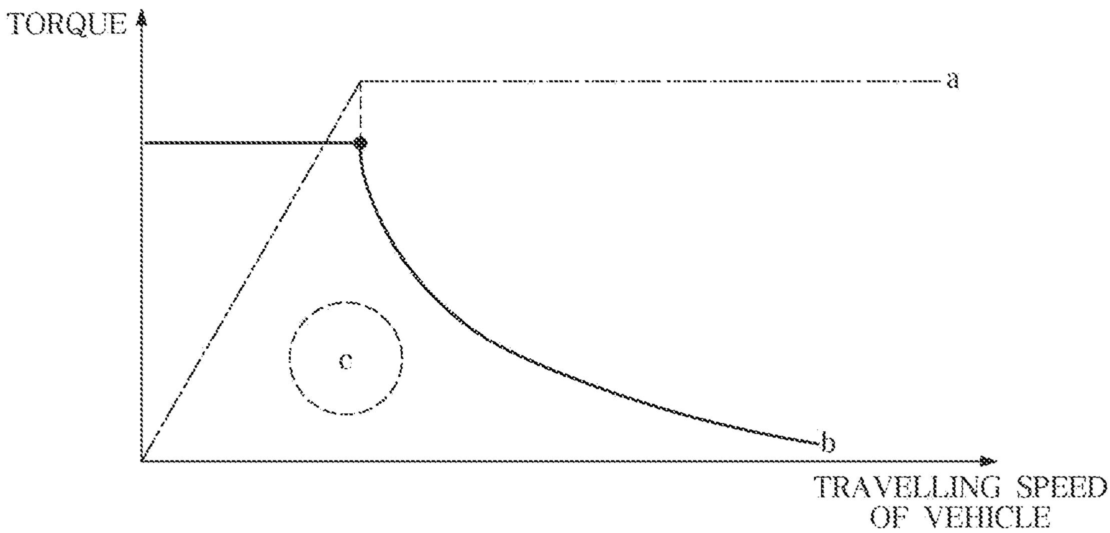
FIG. 6A shows a graph of output power and torque power of a motor corresponding to a travelling speed of the vehicle according to an exemplary embodiment.

FIG. 6A shows a graph of output power and torque power of a motor that corresponds to a travelling speed of the vehicle according to an exemplary embodiment, and FIG. 6B shows a braking efficiency table that corresponds to rotational speed and torque of the motor provided in the vehicle according to exemplary an embodiment. As illustrated in FIG. 6A, the maximum torque of the motor is constant until the travelling speed is equal or less than a predetermined travelling speed among the travelling speed of the vehicle. The maximum output power of the motor may be maintained, and the torque of the motor may be decreased from a point exceeding the predetermined travelling speed.

The travelling speed may correspond to the rotational speed of the motor. In addition, the efficiency is maximum at a point where the torque of the motor and the output power of the motor meet. In other words, the efficiency of the regenerative braking may be an optimum point in a region c including a point where the output power of the motor is maintained after the output power increases, and a point where the torque of the motor is decreased.

As illustrated in FIG. 6B, as the motor speed increases, the regenerative efficiency decreases and the torque of the motor decreases. The efficiency of the regenerative braking that corresponds to the correlation between the travelling speed, the output power of the motor, and the torque of the motor may be stored in the storage of the vehicle as the look-up table. The storage 151 may be configured to store identification information of the vehicle and identification information of the user. The storage 151 may also be configured to store identification information of a user terminal.

The memory of each of the devices may be implemented using at least one of a non-volatile memory element, e.g., a cache, Read Only Memory (ROM), Programmable ROM (PROM), Erasable Programmable ROM (EPROM), Electrically Erasable Programmable ROM (EEPROM) and flash memory, a volatile memory element, e.g., Random Access Memory (RAM), or a storage medium, e.g., Hard Disk Drive (HDD) and CD-ROM. The implementation of the memory is not limited thereto. Each of the memories may be a memory that is implemented by a chip separate from the above mentioned processor related to the controller 150, or may be implemented by a single chip with a processor.

The communication device 160 may be configured to communicate with at least one of the server 3, the other vehicle 2, and the infrastructure 4. The communication device 160 may be configured to transmit a control signal of the controller 150 to at least one of the server 3, the other vehicle 2 and the infrastructure 4, and transmit various information transmitted by at least one of the server 3, the other vehicle 2 and the infrastructure 4 to the controller 150. In addition, the communication device 160 may be configured to communicate with a user terminal 5.

The communication device 160 may further include a global positioning system (GPS) receiver (not shown), and may be configured to transmit information regarding the current position of the vehicle to the controller 150. The communication device 160 may include one or more components configured to allow the communication with the controller 150, the other vehicle, another vehicle, a terminal, and an external device, wherein the communicator may include at least one of a short range communication module, a wired communication module, and a wireless communication module.

The short-range communication module may include a variety of short range communication modules, which is configured to transmit and receive a signal using a wireless communication module in a short range, e.g., Bluetooth module, Infrared communication module, Radio Frequency Identification (RFID) communication module, Wireless Local Access Network (WLAN) communication module, NFC communication module, and ZigBee communication module.

The wired communication module may include a variety of wired communication modules, e.g., Controller Area Network (CAN) communication module, Local Area Network (LAN) module, Wide Area Network (WAN) module, or Value Added Network (VAN) module and a variety of cable communication modules, e.g., Universal Serial Bus (USB), High Definition Multimedia Interface (HDMI), Digital Visual Interface (DVI), recommended standard 232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module. Wireless broadband module, Global System for Mobile (GSM) Communication, Code Division Multiple Access (CDMA), Wideband Code Division Multiple Access (WCDMA), Time Division Multiple Access (TDMA), and Long Term Evolution (LTE).

The motor 170 may be configured to generate rotational power using electrical energy of the battery 110 while the vehicle is being driven, and transmit the generated rotational power to the wheels to drive the wheels. The motor 170 may be configured to operate as the generator when the vehicle is driven by driving power of the other vehicle. In other words, the motor 170 may be configured to operate as the generator when the vehicle is driven by the other vehicle performing the tow mode.

When the vehicle executes the charging mode, the motor 170 rotates by the rotational power of the wheels, and generates a reverse torque by rotating the wheels. At this time, the battery may be charged by the generated reverse torque. The hydraulic braking unit 180 may further include a hydraulic braking device (not shown) configured to generate a hydraulic pressure based on a control command of the controller 150 and apply braking power to the wheels using the generated hydraulic pressure.

The slope detector 190 may be configured to detect a slope of the road. The slope detector 190 may be an acceleration sensor, or may include at least one of a gyro sensor, an angular velocity sensor, and a gravity sensor. The server 3 that communicates with the vehicle 1 will be briefly described. The server 3 may be configured to communicate with a plurality of vehicles using the charging service via the infrastructure 4. The server 3 may be configured to perform communication with a terminal owned by the driver of the plurality of vehicles using the charging service.

When the charging of necessity information (i.e., charging mode information) is received by one of the vehicles, the server 3 may be configured to search the other vehicle based on the information of the one of the vehicles, destination information of the one of the vehicles, and current position information of the one of the vehicles. The other vehicle is a vehicle that performs the tow mode, and provides the charging service to the vehicle.

In particular, the server 3 may be configured to search for a meeting position where two of the vehicles using the charging service may be contacted, transmit information of the searched contact position to the two vehicles as destination information, and also transmit vehicle information of the two vehicles to each other. The server 3 may be configured to transmit the service cost for using the charging service to the two vehicles. In particular, the server may be configured to transmit the service cost information to the vehicle terminal of each of the vehicles or the service cost information to the terminal of the drivers of each of the vehicles.

The server 3 may be configured to store the application for using the charging service, and transmit the stored application to the terminal of the driver of the vehicle using the charging service. The server 3 may be configured to store information of the vehicle using the charging service. The information of the vehicle may include the vehicle type, the license plate number, the color, and driver information. The information of the vehicle stored in the vehicle may be information registered by the vehicle owner. The vehicle owner may be the person who requested the use of the charging service.

The server 3 may be a server provided in at least one of a service center for managing the vehicle 1 and the other vehicle 2, a manufacturer, a technology supply and repair center, and a charge management center. The server 3 may be an application (i.e., an app) server that provides a service associated with the vehicle 1 and the other vehicle 2. The server may perform functions of a server via the terminal of the user provided with an application (i.e., an app) providing a service associated with the plurality of vehicles.

The terminal 5 is a terminal for the user, is capable of communication and portability, and may be a device capable of downloading, storing and executing an application for the charging service. The user terminal 5 may be realized as a computer or a portable terminal device capable of connecting to the vehicle and the server over a network.

In particular, the computer may include, for example, a notebook, a desktop, a laptop, a tablet personal computer (PC), a slate PC, and the like in which a web browser is installed, and the portable terminal device includes, for example, all types of handheld-based wireless communication devices such as a personal communication system (PCS), a global system for mobile communications (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smartphone, and a wearable device such as a watch, a ring, a bracelet, an anklet, a necklace, glasses, contact lenses, or a head-mounted-device (HMD) as a wireless communication device with guaranteed portability and mobility.

Figure 7:
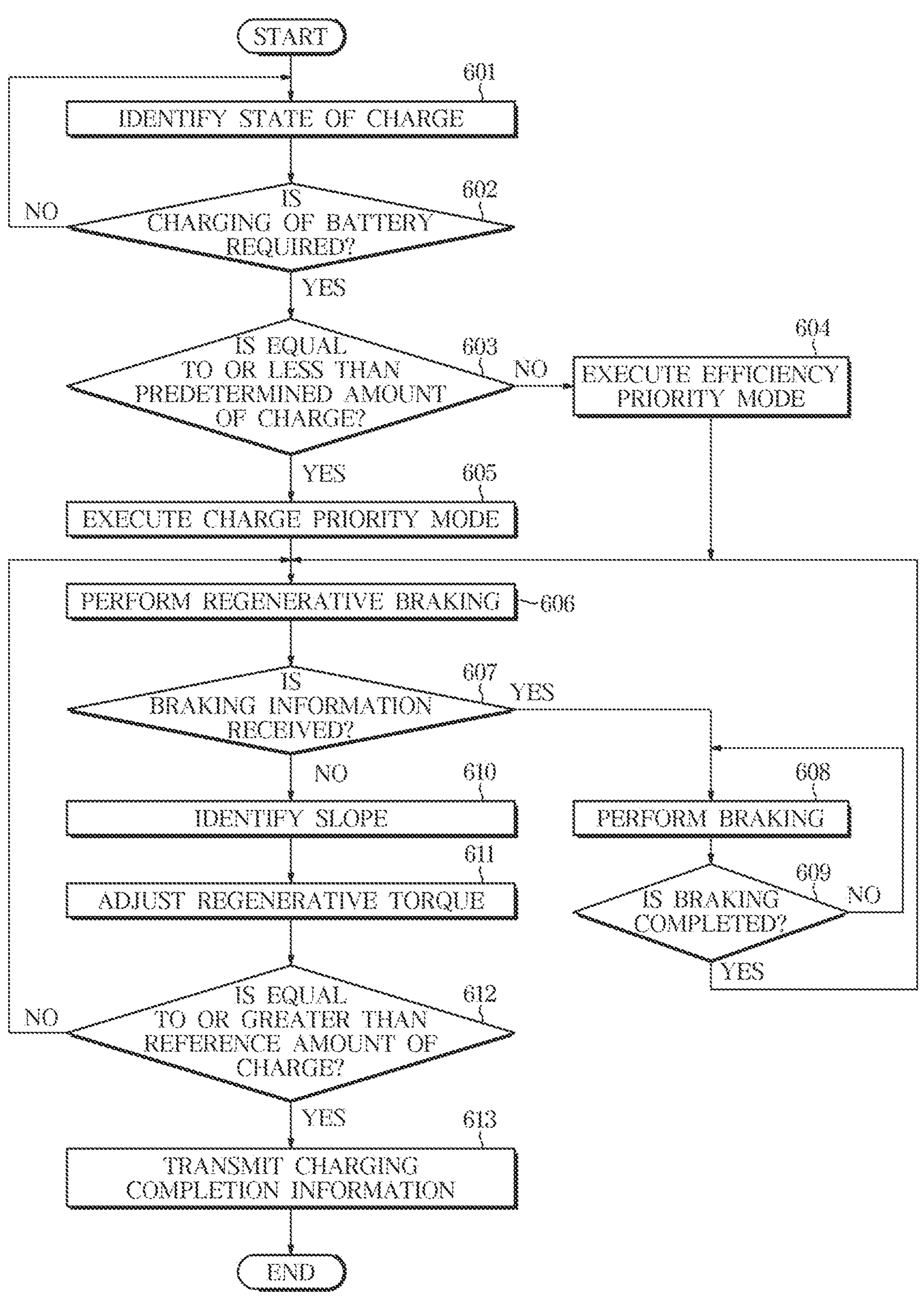
FIG. 7 is a flowchart illustrating an example of a control method of the vehicle for controlling a charging mode when performing a charging service using another vehicle communicating with the vehicle according to an exemplary embodiment.

FIG. 7 is a flowchart illustrating an example of a control method of the vehicle for controlling a charging mode when performing a charging service using another vehicle communicating with the vehicle according to an exemplary embodiment. The various methods described herein below may be executed by a controller.

Particularly, the vehicle 1 may be configured to determine a state of charge (SOC) of the battery through the monitoring device 130 (601), determine charging state information that corresponds to the state of charge (SOC) of the battery monitored by the monitoring device 130, and determine whether charging of the battery is necessary based on the identified charging state information. The determining of whether charging of the battery is necessary may include determining whether charging of the battery is required (602).

The vehicle 1 may be configured to determine an amount of charge of the battery based on the charging state information, compare the identified amount of charge with a preset amount of charge. When the identified amount of charge is less than or equal to the preset amount of charge, the vehicle 1 may be configured to determine that charging of the battery is required. In response to determining that charging of the battery 110 is required, the vehicle 1 may be configured to display charging of necessity information via the terminal 140 provided in the vehicle 1. At this time, the vehicle 1 may be configured to display a message requesting the user to use the charging service through the terminal 140.

When the ON command for the charging service is input (by a user), the vehicle 1 may be configured to search the terminal 140 for other vehicles present within a certain distance from a current position of the vehicle 1 based on information of the current position of the vehicle 1. When searching for the other vehicles within the certain distance, the vehicle may be configured to search for the other vehicles having the same destination or search for the other vehicles having the same route to a specific position.

The vehicle 1 may be configured to request the provision of the charging service to the searched other vehicles. In other words, the vehicle 1 may be configured to transmit provision request information of the charging service that corresponds to the charging of necessity information. When acceptance information of the charging service is received from the other vehicle, the vehicle 1 may be configured to select a contact position to meet with the other vehicle, generate a new route from the current position to the contact position based on information of the current position and information of the contact position, and provide guidance along a route through the generated route.

The information of the contact position may be received from the other vehicle, or received from a server. The vehicle may be configured to transmit the information of the contact position to the other vehicle. When the vehicle 1 meets or reaches the other vehicle 2, the vehicle 1 may be mechanically connected to the other vehicle. When the vehicle 1 is mechanically connected to the other vehicle, the vehicle 1 may be connected to enable communication. In other words, the vehicle 1 may be connected to the other vehicle 2 via a communication line. The vehicle 1 may be configured to perform regenerative braking.

When the vehicle 1 is towed by as the other vehicle is being driven, the vehicle 1 may be configured to charge the battery using energy generated by the regenerative braking. More specifically, the vehicle 1 may be configured to execute the charging mode when mechanically connected to the other vehicle 2. The vehicle 1 may be configured to determine whether the amount of charge before entering the charging mode is equal to or less than a predetermined amount of charge (603). In response to determining that the amount of charge of the battery exceeds the predetermined amount of charge, the vehicle 1 may be configured to execute the efficiency priority mode (604), and transmit information regarding the efficiency priority mode to the other vehicle.

The transmitting of the information regarding the efficiency priority mode to the other vehicle, may include, when a rotational speed of the motor of the vehicle reaches a reference rotational speed, identifying regenerative torque that corresponds to the reference rotational speed, and transmitting the identified regenerative torque to the other vehicle. The reference rotational speed may be a speed that corresponds to a traveling speed of the vehicle, or may be a speed that corresponds to a reference efficiency, may be or a speed that corresponds to an area C in FIG. 6A.

The vehicle may be configured to charge the battery based on the regenerative torque that corresponds to the reference rotational speed. At this time, the vehicle may be configured to maintain the rotational speed of the motor at the reference rotational speed. In response to determining that the amount of charge before entering the charging mode is equal to or less than the predetermined amount of charge, the vehicle may be configured to execute the charge priority mode (605), and transmit information regarding the charge priority mode to the other vehicle.

The transmitting of the information regarding the charge priority mode to the other vehicle, may include identifying a maximum regenerative torque, and transmitting the identified maximum regenerative torque to the other vehicle. The vehicle may be configured to perform the regenerative braking based on the maximum regenerative torque (606) to charge the battery. At this time, the other vehicle may be configured to obtain a traveling torque based on the received maximum regenerative torque.

Additionally, the other vehicle may be configured to identify the regenerative torque that may be output from the other vehicle, compare the identified regenerative torque with the received maximum regenerative torque, and obtain a traveling torque based on the smaller regenerative torque among the identified regenerative torque with the received maximum regenerative torque. When the regenerative torque capable of being output from the other vehicle is received by the other vehicle, the vehicle may be configured to compare the received regenerative torque of the other vehicle with the maximum regenerative torque, and transmit the smaller regenerative torque among the received regenerative torque with the maximum regenerative torque to the other vehicle.

The vehicle may be configured to perform the regenerative braking based on the identified regenerative torque to charge the battery. At this time, the other vehicle may be configured to obtain the traveling torque based on the received regenerative torque. The other vehicle may be configured to identify the regenerative torque that may be output from the other vehicle, compare the identified regenerative torque of the other vehicle with the received regenerative torque, and obtain the traveling torque based on the smaller regenerative torque among the identified regenerative torque with the received regenerative torque to the other vehicle.

Further, the vehicle may be configured to receive the regenerative torque from the other vehicle, compare the received regenerative torque of the other vehicle with the identified regenerative torque, and transmit the smaller regenerative torque among the received regenerative torque with the identified regenerative torque to the other vehicle. At this time, the other vehicle may be configured to obtain the traveling torque based on the received regenerative torque. When braking information is received from the other vehicle 2 (607), the vehicle may be configured to identify additional braking power that corresponds to the received braking information, and perform braking by adjusting at least one of hydraulic braking of the hydraulic braking unit and regenerative braking of the motor 170 (608).

The vehicle 1 may be configured to determine whether the braking is completed (609), and in response to determining that the braking is completed, perform the regenerative braking to charge the battery. Determining whether the braking is completed may include determining whether braking power generated by at least one of the regenerative braking of the motor 170 and the hydraulic braking of the hydraulic braking unit 180 is the same as the additional braking power. Additionally, determining whether the braking is completed may include determining whether braking end information has been received from the other vehicle.

The vehicle may be configured to identify a slope of a road detected by the slope detector 190 (610), and adjust the regenerative torque based on the identified slope (611). For example, when the slope of the road is equal to or greater than a first reference slope, the vehicle may be configured to decrease the reference regenerative torque by a value that corresponds to the slope of the road. This makes it possible to prevent deterioration of the power performance.

When the slope of the road is less than a second reference slope, the vehicle may be configured to increase the reference regenerative torque by a value that corresponds to the slope of the road. This ensures a safe operation. The first reference slope may be a slope for determining an uphill road, and the second slope may be a slope for determining a downhill road. The vehicle may be configured to compare the charged amount of the battery with the reference amount of charge, and when the charged amount of the battery is equal to or greater than the reference amount of charge (612), complete the charging, and transmit charging completion information to the other vehicle (613). This makes it possible to prevent a sudden change in driving ability due to a sudden regeneration stop of the vehicle when the battery is fully charged. The completing of the charging may include terminating the regenerative braking of the motor.

Figure 8:
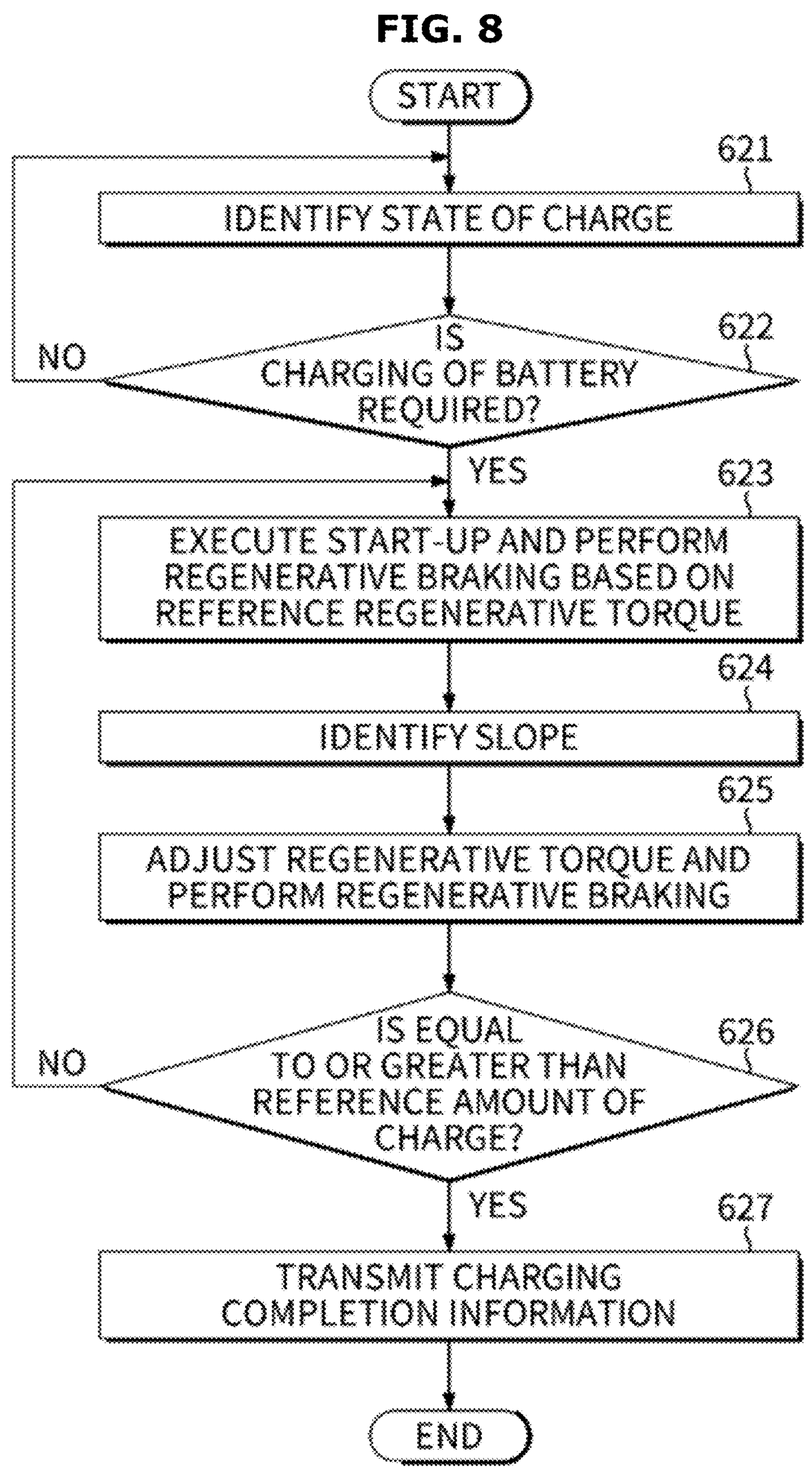
FIG. 8 is a flowchart illustrating an example of the control method of the vehicle for controlling the charging mode when performing the charging service using another vehicle not communicating with the vehicle according to an exemplary embodiment.

FIG. 8 is a flowchart illustrating an example of the control method of the vehicle for controlling the charging mode when performing the charging service using another vehicle not communicating with the vehicle according to an exemplary embodiment. In particular, the vehicle 1 may be configured to determine a state of charge (SOC) of the battery through the monitoring device 130 (621), determine charging state information corresponding to the state of charge (SOC) of the battery monitored by the monitoring device 130, and determine whether charging of the battery is necessary based on the identified charging state information (622).

The determining of whether charging of the battery is necessary may include determining whether charging of the battery is required. The vehicle 1 may be configured to determine an amount of charge of the battery based on the charging state information, compare the identified amount of charge with a preset amount of charge, and when the identified amount of charge is less than or equal to the preset amount of charge, determine that charging of the battery is required. The vehicle may request the charging service to other vehicle nearby.

The vehicle may be configured to request the charging service via communication with a terminal for the user located in the other vehicle nearby. When using the charging service, the vehicle 1 may be mechanically connected to the other vehicle. The vehicle 1 may be configured to perform the regenerative braking while being towed by the driving of the other vehicle, and charge the battery 110 using energy generated by the regenerative braking. More specifically, the vehicle 1 may be configured to perform the charging mode when it is mechanically connected to the other vehicle. At this time, the other vehicle may be configured to perform the tow mode.

The vehicle 1 may be configured to determine whether the amount of charge before entering the charging mode is equal to or less than a predetermined amount of charge. In response to determining that the amount of charge before entering the charging mode is equal to or less than the predetermined amount of charge, the vehicle 1 may be configured to execute the charge priority mode. In response to determining that the amount of charge of the battery exceeds the predetermined amount of charge, the vehicle 1 may be configured to execute the efficiency priority mode. When executing the charge priority mode, the vehicle may be configured to identify a maximum regenerative torque, and perform the regenerative braking based on the identified maximum regenerative torque.

When executing the efficiency priority mode, the vehicle may be configured to identify a reference regenerative torque, and perform the regenerative braking based on the identified reference regenerative torque (623) to charge the battery. The vehicle may be configured to identify a rotational speed of the motor, and obtain a regenerative torque that corresponds to the identified rotational speed of the motor The vehicle may be configured to determine a slope of a road detected by the slope detector 190 (624), adjust the regenerative torque based on the identified slope, and perform the regenerative braking based on the adjusted regenerative torque (625). For example, when the slope of the road is equal to or greater than a first reference slope, the vehicle may be configured to decrease the reference regenerative torque by a value that corresponds to the slope of the road. This makes it possible to prevent deterioration of the power performance.

When the slope of the road is less than a second reference slope, the vehicle may be configured to increase the reference regenerative torque by a value that corresponds to the slope of the road. This ensures a safe operation. The first reference slope may be a slope for determining an uphill road, and the second slope may be a slope for determining a downhill road. The vehicle may be configured to compare the charged amount of the battery with the reference amount of charge, and when the charged amount of the battery is equal to or greater than the reference amount of charge (626), complete the charging, and transmit charging completion information to the terminal 5 for the user located in the other vehicle (627). This makes it possible to prevent a sudden change in driving ability due to a sudden regeneration stop of the vehicle when the battery is fully charged. The completing of the charging may include terminating the regenerative braking of the motor.

In addition, when the communication of the vehicle is impossible, the user of the vehicle may request the provision of the charging service using the terminal for the user. When the charging completion information is input to the terminal of the user of the vehicle, the user of the vehicle may transmit the charging completion information to the terminal located in the other vehicle or another vehicle by using the terminal for the user.

Figure 9:
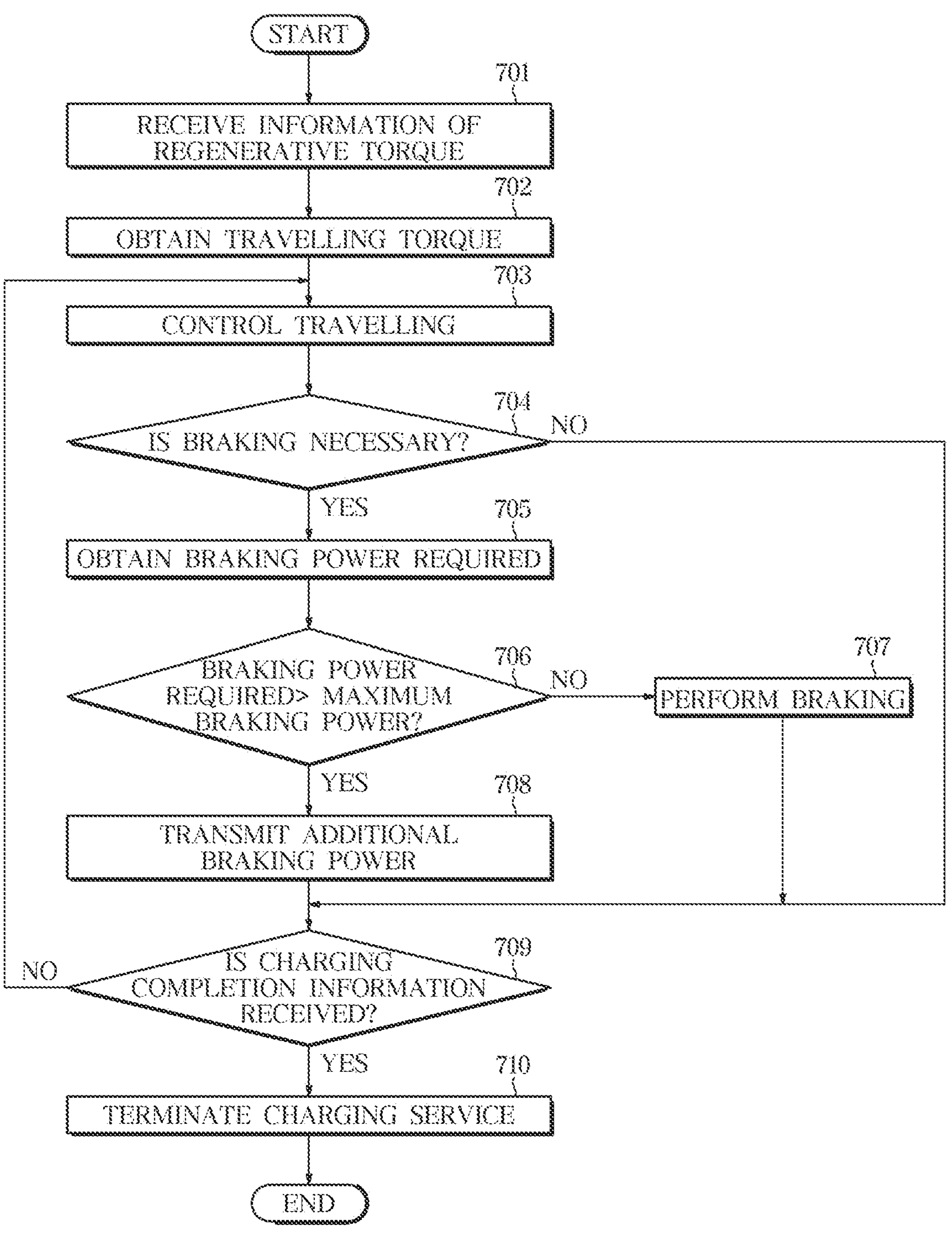
FIG. 9 is a flowchart illustrating an example of the control method of the vehicle for controlling a tow mode when performing the charging service using another vehicle communicating with the vehicle according to an exemplary embodiment.

FIG. 9 is a flowchart illustrating an example of the control method of the vehicle for controlling a tow mode when performing the charging service using another vehicle communicating with the vehicle according to an exemplary embodiment.

When charging of necessity information is received by the other vehicle 2, the vehicle 1 may be configured to display the charging of necessity information through the terminal 140 for the vehicle. The charging of necessity information may be provision request information of the charging service. Then, the vehicle may be configured to determine whether an acceptance command for providing the charging service is received, and transmit rejection information to the other vehicle in response to determining that the acceptance command is not received.

In response to receiving the acceptance command, the vehicle may be configured to transmit acceptance information to the other vehicle. The acceptance information may be charge supply information. When information of a contact position is received by the other vehicle, the vehicle 1 may be configured to generate a new route from the current position to the contact position based on the information of the current position and information of the contact position, and perform route guidance through the terminal 140 for the vehicle based on the generated route.

The vehicle 1 may be configured to determine a current position of the other vehicle, select a contact position to meet or reach with the other vehicle based on the identified current position and the current position of the vehicle, and transmit information of the selected contact position to the other vehicle. The vehicle 1 may be configured to terminate the route guidance when the current position is the contact position, and display information of the other vehicle through the terminal for the vehicle.

When the vehicle 1 performs the tow mode, the vehicle may pull the other vehicle 2. The other vehicle 2 may be configured to perform the charging mode with a vehicle requesting the charging service in response to the charging of necessity information of the vehicle 1. The other vehicle 2 may be an eco-friendly vehicle. When the charging service is used, the vehicle 1 and the other vehicle 2 may be connected by the coupling member 6 and the connection member 8 provided in each of the vehicles. As a result, the two vehicles 1 and 2 may travel at a certain distance from each other.

When a regenerative torque is received by the other vehicle during execution of the tow mode (701), the vehicle 1 may be configured to obtain a traveling torque based on the received regenerative torque (702), and operate the motor based on the obtained traveling torque (703). The traveling torque may be a torque that is a sum of a torque required for driving the vehicle and a regenerative torque for charging the battery of the other vehicle.

The torque required for driving the vehicle may be determined by a pressure applied by the accelerator pedal and a traveling speed of the vehicle, and may be determined by a pressure applied by the brake pedal and the traveling speed of the vehicle. The vehicle 1 may be configured to transmit the regenerative torque to the other vehicle. In particular, the regenerative torque may be preset information. When the vehicle is a hybrid vehicle, the vehicle 1 may be configured to identify the regenerative torque received from the other vehicle in the execution of the tow mode, obtain the traveling torque based on the received regenerative torque, and may be driven by operating at least one of the motor and the engine based on the obtained traveling torque.

When the vehicle is an engine-driven vehicle, the vehicle 1 may be configured to identify the regenerative torque received from the other vehicle in the execution of the tow mode, obtain the traveling torque based on the received regenerative torque, and may be driven by operating the engine based on the obtained traveling torque. When the brake pedal is pressed or engaged, the vehicle may be configured to detect that braking is necessary (704), and obtain braking power required by the driver based on a pressure of the brake pedal (705).

The vehicle may be configured to obtain a maximum braking power by summing regenerative braking power of the motor and hydraulic braking power of the hydraulic braking unit capable of being output from the vehicle, and compare the obtained maximum braking power with the required braking power. When the required braking power is less than the maximum braking power, the vehicle may be configured to operate at least one of the motor and the hydraulic braking unit to perform braking (707).

When the required braking power is equal to greater than the maximum braking power, the vehicle may be configured to obtain additional braking power that corresponds to the difference between the required braking power and the maximum braking power, and transmit the obtained additional braking power to the other vehicle (708). When the brake pedal is released from pressure or disengaged, the vehicle may be configured to transmit braking completion information to the other vehicle.

The vehicle may be configured to determine whether charging completion information is received from the other vehicle (709). In response to determining that the charging completion information is received from the other vehicle, the vehicle may be configured to terminate the charging service (710). The charging completion information may be displayed through the terminal for the vehicle. When the charging service is completed, the vehicle may be configured to determine an execution time of the charging service, obtain the service cost based on the determined execution time, determine a distance traveled during the charging service, and obtain the service cost based on the determined distance. In particular, the vehicle may be configured to obtain the service cost based on the charge state information of the battery monitored through the monitoring device. The vehicle may be configured to display information regarding the obtained service cost through the terminal.

As is apparent from the above description, a vehicle and a method of controlling the vehicle in accordance with one exemplary embodiment of the present disclosure may be indirectly driven by being towed by another vehicle in a situation where charging and traveling are unable to be performed at the same time, and may charge a battery by regenerative braking during towing by the other vehicle. Further, the present disclosure may improve the image of a manufacturer through a traction service of the manufacturer, and may minimize the inconvenience of users using eco-friendly vehicles.

The present disclosure may increase the use of the traction service of the charging service by paying the cost of using the service to the vehicle providing the traction service, and may improve the satisfaction of users using the eco-friendly vehicles. The present disclosure solves the inconvenience of the eco-friendly vehicles, thereby increasing the amount of sales and usage of the eco-friendly vehicles. As a result, environmental pollution caused by the vehicle may be reduced. As is apparent from the above description, a vehicle and a method of controlling the vehicle in accordance with another embodiment of the present disclosure may improve the safety at the time of traction by adjusting a regenerative torque based on a slope of a road, and performing braking by receiving braking information from another vehicle in a tow mode.

Additionally, a vehicle and a method of controlling the vehicle in accordance with another exemplary embodiment of the present disclosure the charging completion information is output through a terminal for a user at the time of completion of charging of the battery, thereby preventing abrupt change in travelling performance due to regeneration interruption. Accordingly, the quality and commercial value of an eco-friendly vehicle may be improved, which leads to an increase of user satisfaction and improvement of reliability and safety of the vehicle, thereby securing competitiveness of the product.

Meanwhile, the disclosed exemplary embodiments may be embodied in the form of a recording medium storing instructions executable by a computer. The instructions may be stored in the form of a program code and, when executed by a processor, may generate a program module to perform the operations of the disclosed embodiments. The recording medium may be embodied as a non-transitory computer-readable recording medium. The non-transitory computer-readable recording medium includes all kinds of recording media in which instructions which can be decoded by a computer are stored. For example, there may be Read Only Memory (ROM), Random Access Memory (RAM), a magnetic tape, a magnetic disk, a flash memory, and an optical data storage device.

Although a few that corresponds embodiments of the present disclosure have been shown and described, it would be appreciated by those skilled in the art that changes may be made in these that corresponds embodiments without departing from the principles and spirit of the disclosure, the scope of which is defined in the claims and their equivalents.

What is claimed is:

1. A vehicle, comprising:

a battery;

a motor configured to rotate a wheel using electric power charged in the battery and to generate electric power via regenerative braking;

a coupling member configured to enable the vehicle to be physically towed by another vehicle; and a controller configured to:

execute start-up when using a charging service, wherein using the charging service comprises the vehicle being physically towed by one of the other vehicles such that the wheels of the vehicle are rotated by a driving force of the one of the other vehicles;

charge the battery based on electric power generated by the motor; and when executing the charging, charge the battery based on a reference regenerative torque;

wherein the charging of the battery occurs without a supply of charging power from the one of the other vehicles.

2. The vehicle of claim 1, wherein, while using the charging service, the controller is configured to execute a charge priority mode when the amount of charge of the battery is less than a predetermined amount of charge, and execute an efficiency priority mode when the amount of charge of the battery exceeds the predetermined amount of charge at the time of using the charging service.

3. The vehicle of claim 2, wherein, during the charge priority mode, the controller is configured to determine a predetermined maximum regenerative torque, and charge the battery based on the predetermined maximum regenerative torque.

4. The vehicle of claim 3, further comprising:

a slope detector configured to detect a slope of a road, wherein the controller is configured to adjust the determined maximum regenerative torque based on the detected slope, and charge the battery based on the adjusted maximum regenerative torque.

5. The vehicle of claim 2, wherein, during the efficiency priority mode, the controller is configured to maintain a rotational speed of the motor at a reference rotational speed, determine a regenerative torque corresponding to the reference rotational speed, and charge the battery based on the determined regenerative torque.

6. The vehicle of claim 2, further comprising:

a storage configured to store, as a look-up table, efficiency corresponding to a traveling speed of the vehicle, an output capability of the motor, and a torque of the motor, wherein, during the efficiency priority mode, the controller is configured to charge the battery based on the look-up table stored in the storage.

7. The vehicle of claim 1, further comprising:

a slope detector configured to detect a slope of a road, wherein the controller is configured to determine a regenerative torque corresponding to a rotational speed of the motor, adjust the determined regenerative torque based on the detected slope, and charge the battery based on the adjusted regenerative torque.

8. The vehicle of claim 1, wherein the coupling member is coupled to a connection member provided on the one of the other vehicles, wherein, while using the charging service, the controller is configured to execute starting.

9. The vehicle of claim 1, further comprising a communication device configured to perform communication with the one of the other vehicles;

wherein, when information of braking power is received by the one of the other vehicles, the controller is configured to determine additional braking power from the received information, and execute regenerative braking of the motor based on the determined additional braking power.

10. The vehicle of claim 1, further comprising a communication device configured to perform communication with the one of the other vehicles;

wherein, when a regenerative torque corresponding to regenerative capability of the one of the other vehicles is received by the one of the other vehicles, the controller is configured to determine the regenerative torque of the motor for charging the battery, and operate the communication device to transmit information of a smaller torque among the regenerative torque of the motor and the received regenerative torque to the one of the other vehicles.

11. The vehicle of claim 1, further comprising a communication device configured to perform communication with the one of the other vehicles;

wherein, when provision request information of the charging service is received by another vehicle, the controller is configured to determine a required torque for traveling, when a regenerative torque of the motor is received by another vehicle, obtain a traveling torque based on the received regenerative torque and the required torque, and operate the motor based on the obtained traveling torque.

12. The vehicle of claim 11, wherein, when provision request information of the charging service is received by another vehicle, the controller is configured to operate the communication device to transmit a regenerative torque corresponding to regenerative capability in the vehicle to another vehicle.

13. The vehicle of claim 1, further comprising a communication device configured to perform communication with the one of the other vehicles;

wherein, when the amount of charge of the battery is a reference amount of charge while using the charging service, the controller is configured to determine that the charging of the battery is completed, and operate the communication device to transmit charging completion information to another vehicle.

14. The vehicle of claim 1, further comprising a communication device configured to perform communication with the one of the other vehicles;

wherein, when communication with the one of the other vehicles is not connected while using the charging service, the controller is configured to determine that the charging of the battery is completed, and operate the communication device to transmit charging completion information to a terminal provided in the one of the other vehicles.

15. The vehicle of claim 1, further comprising:

a slope detector configured to detect a slope of a road; and a communication device configured to perform communication with a terminal provided in the other vehicle;

wherein the controller is configured to adjust the reference regenerative torque based on the detected slope, and charge the battery based on the adjusted reference regenerative torque, wherein, when communication with the other vehicle is not connected while using the charging service, the controller is configured to determine an amount of charge of the battery, when the determined amount of charge is a reference amount of charge, determine that the charging of the battery is completed, and operate the communication device to transmit charging completion information to the terminal.

16. A method for controlling a vehicle having a motor configured to rotate a wheel using electric power charged in the battery and to generate electric power via regenerative braking, a battery, and a coupling member configured to enable the vehicle to be physically towed by another vehicle, the method comprising:

executing, by a controller, start-up when using a charging service, wherein the charging service comprises the vehicle being physically towed by one of the other vehicles such that the wheels of the vehicle are rotated by a driving force of the one of the other vehicles;

charging, by the controller, the battery based on electric power generated by the motor; and when executing the charging, charge the battery based on a reference regenerative torque;

wherein the charging of the battery occurs without a supply of charging power from the one of the other vehicles.

17. The method of claim 16, wherein the charging of the battery includes:

executing, by the controller, a charge priority mode when the amount of charge of the battery is less than a predetermined amount of charge; and executing, by the controller, an efficiency priority mode, when the amount of charge of the battery exceeds the predetermined amount of charge, wherein the executing of the charge priority mode includes: determining, by the controller, a predetermined maximum regenerative torque, and charging the battery based on the predetermined maximum regenerative torque, wherein the executing of the efficiency priority mode includes: maintaining, by the controller, a rotational speed of the motor at a reference rotational speed, determining a regenerative torque corresponding to the reference rotational speed, and charging the battery based on the determined regenerative torque.

18. The method of claim 16, wherein the charging of the battery includes:

detecting, by the controller, a slope of a road;

adjusting, by the controller, a regenerative torque based on the detected slope; and charging, by the controller, the battery based on the adjusted regenerative torque.

19. The method of claim 16, wherein the vehicle further comprises a communication device configured to perform communication with the one of the other vehicles, the method further comprising:

performing, by the controller, a tow mode when provision request information of the charging service is received by another vehicle via the communication device;

determining, by the controller, a required torque for traveling;

when a regenerative torque of the motor is received by another vehicle, obtaining, by the controller, a traveling torque based on the received regenerative torque and the required torque; and operating, by the controller, the motor based on the obtained traveling torque.

* * * * *